United States Patent [19]
Johansson et al.

[11] 3,954,053
[45] May 4, 1976

[54] RACK OVEN

[75] Inventors: Leif A. T. Johansson, Huddinge; Erik I. Peterson, Vallentuna, both of Sweden

[73] Assignee: Tipe Revent AB, Stockholm, Sweden

[22] Filed: Apr. 30, 1975

[21] Appl. No.: 573,375

[30] Foreign Application Priority Data
May 6, 1974 Sweden .............................. 74060096

[52] U.S. Cl. .............................. 99/443 R; 99/479
[51] Int. Cl.² ...................... A21B 1/00; A21B 3/02
[58] Field of Search ............ 99/443, 352, 355, 360, 99/373, 391, 393, 423, 447–448, 449–450, 467, 469, 475, 477, 479; 126/19; 211/178, 95–96, 98, 163, 166, 175–176

[56] References Cited
UNITED STATES PATENTS

| | | | |
|---|---|---|---|
| 1,554,906 | 9/1925 | Brand | 99/479 |
| 1,704,650 | 3/1929 | Brand | 99/479 |
| 2,440,513 | 4/1948 | Kaelin et al. | 211/178 R |
| 2,512,340 | 6/1950 | Krauss | 211/178 R |
| 3,618,511 | 11/1971 | Matthews | 99/443 C |

Primary Examiner—Robert W. Jenkins
Assistant Examiner—Arthur O. Henderson
Attorney, Agent, or Firm—Hill, Gross, Simpson, Van Santen, Steadman, Chiara & Simpson

[57] ABSTRACT

In a rack oven for heating food products a rotatable rack suspension frame is mounted at the top of the oven chamber. The frame and the door of the oven chamber are vertically displaceable and mechanically connected with each other such that the opening of the door causes the frame to be lowered to place the rack on the floor and the door to be lifted, the lifting being aided by the weight of the rack, while closing of the door causes the door to be lowered and the frame to be lifted to lift the rack from the floor, this lifting being aided by the weight of the door. Swingable wings of the frame are aided by the weight of the rack to ensure a firm holding of the suspended rack in a centered position.

2 Claims, 6 Drawing Figures

RACK OVEN

This invention relates to an oven for heating food products, more particularly to a so-called rack oven, that is, a cabinet or chamber type oven in which the food products to be heated are supported on pans or other superimposed carriers in a rack, which is usually provided with wheels and which is moved into the oven chamber when loaded with the food products and removed from the oven chamber when the heating is completed.

An oven of this kind is shown in U.S. Pat. No. 3,641,945. In that oven, a rack support yoke is mounted at the top of the oven chamber and rotatable at low speed about a vertical axis by an electric motor. A linkage connects the door of the oven chamber with the yoke such that the yoke is lifted to an upper position when the door, which is swingable about a vertical axis, is closed to close the oven chamber and lowered to a lower position when the door is opened. The electric motor is also controlled in response to the closing and opening of the door such that the yoke is halted in a predetermined angular position when the door is opened.

When the door is open and the yoke accordingly is in the lower position and angularly oriented in a predetermined direction, the rack with the food products may be rolled into the oven to a position in vertical alignment with the yoke. In this position a pair of horizontal flanges of the yoke engage beneath a pair of associated flanges at the top of the rack. As the door is closed, the yoke lifts the rack from the floor so that the rack becomes freely suspended from the yoke which then starts rotating slowly with the rack.

Since the lifting of the rack takes place only after the rack has been rolled into the oven chamber, the rack can be rolled in and lifted without appreciable physical effort and without subjecting the rack to shocks. Moreover, since the means supporting and rotating the rack are provided at the top of the oven chamber, the floor of the oven chamber can be a thin plate or simply the floor of the room in which the oven is located. This additionally facilitates the rolling in of the rack, since the rack need not be rolled up a ramp between the floor of the oven chamber and the floor of the room.

However, as a consequence of the small difference in the levels of the floor of the oven chamber and the floor of the room, the door of the oven chamber has to extend almost down to the floor of the room in order that a tight closing off of the oven chamber may be achieved and undue heat losses may be avoided. This, in turn, means that the lower edge of the door may easily scrape against the floor of the room when it is swung open.

It may also happen that the rack becomes displaced relative to the yoke during the rotation, e.g. because it is unevenly loaded or misaligned with the yoke.

These and other disadvantages are overcome in the oven according to the invention which is constructed in accordance with the appended main claim. Advantageous embodiments may have one or more of the features set forth in the subordinate claims.

An embodiment of the invention is described in more detail hereinafter with reference to the accompanying drawings.

Figure 1:
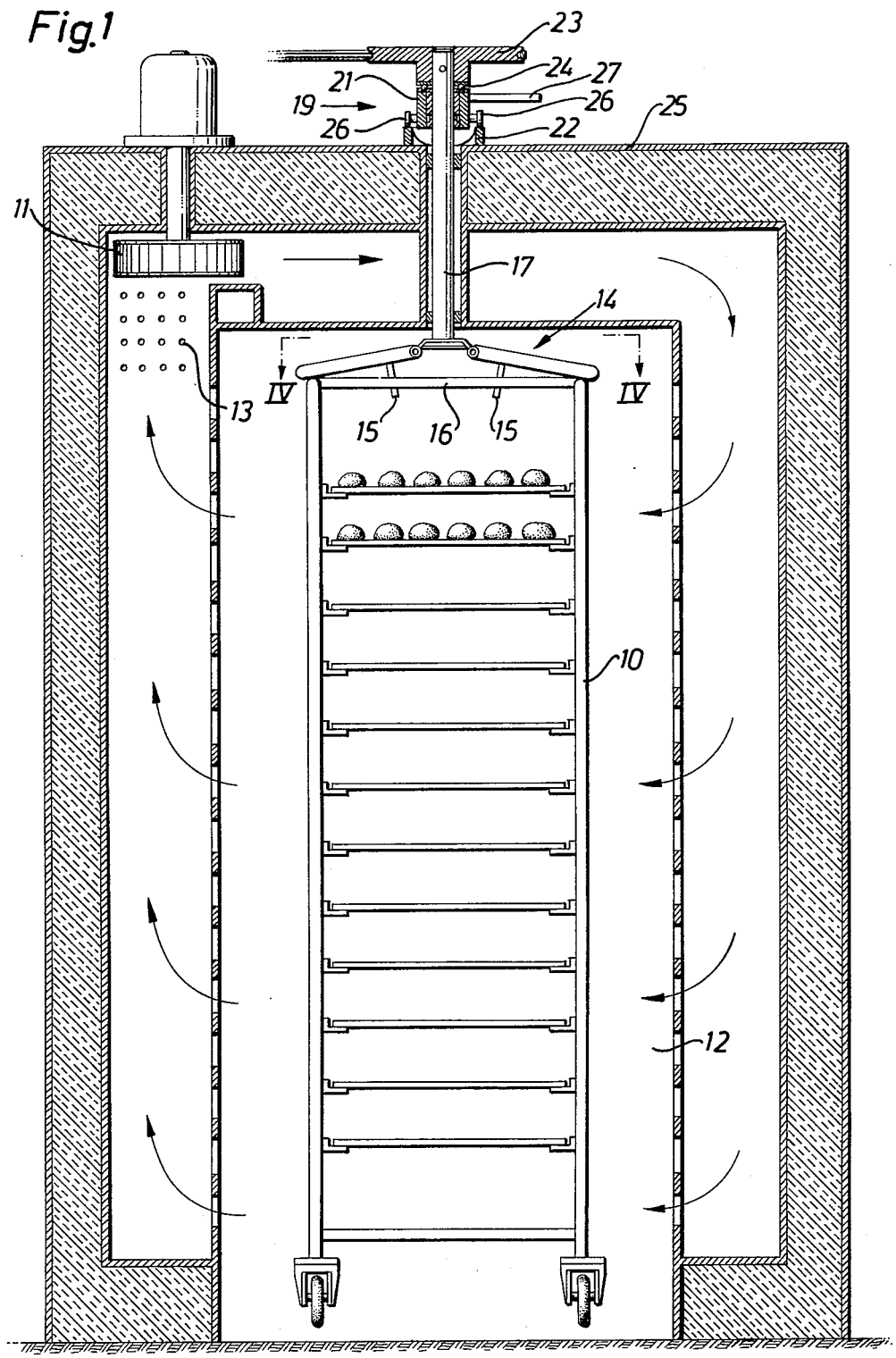
FIG. 1 is a sectional elevation of an oven embodying the invention.
Figure 2:
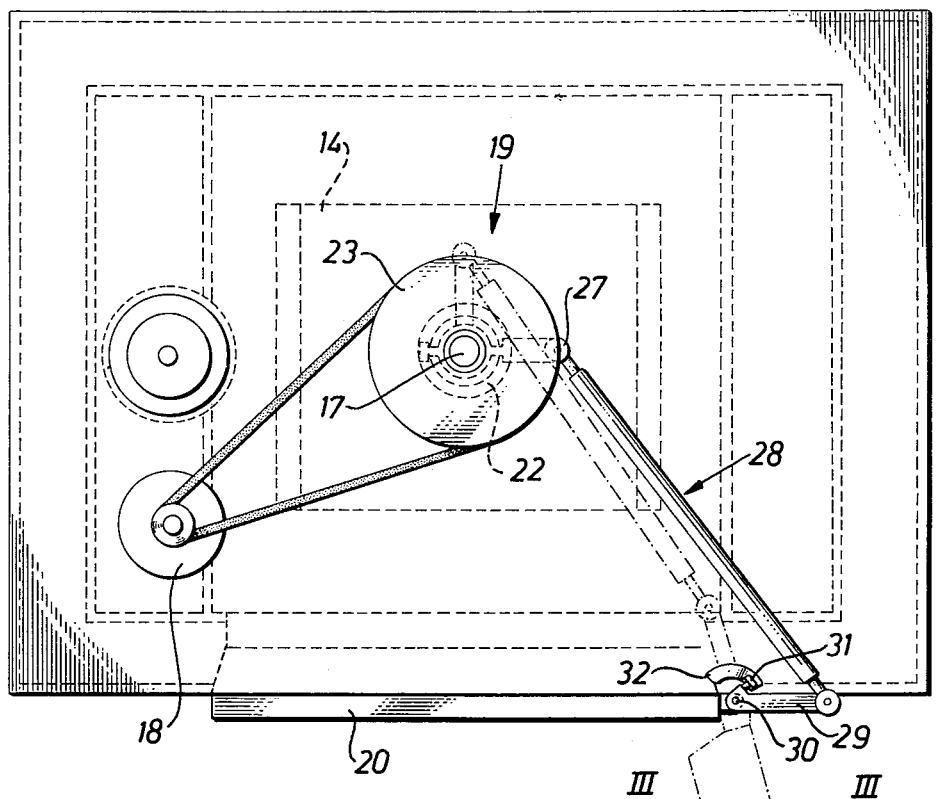
FIG. 2 is a plan view of the oven shown in FIG. 1.

The oven shown in FIGS. 1 and 2 is a convection oven and, accordingly, the food products to be heated, which may be bread to be baked or meat to be cooked, for example, is heated by being directly touched by flowing hot air. The food products are placed on pans or other suitable supports in a wheeled rack 10 in the oven chamber 12, and the hot air is caused to flow substantially horizontally through the oven chamber by a fan 11 and is heated in a heater 13.

At the top the oven chamber 12 houses a rotatable rack support 14 in the form of a frame having a pair of hooks gripping a horizontal tube section 16 on the rack 10 to keep the latter lifted from the floor of the oven chamber as shown in FIG. 1. The support 14 is carried by the lower end of a vertical rotatable shaft 17 which is driven by a motor 18 through a V-belt transmission to rotate the support and the rack 10 suspended therefrom. The support 14 can be shifted vertically between an upper position as shown in FIG. 1, in which the rack 10 is freely suspended from the support and firmly held thereby, and a lower position not shown, in which the rack is resting directly on the floor of the oven chamber and, without encountering any obstruction, can be rolled into a position in vertical alignment with the support and pulled out of that position.

The shifting of the support 14 between the two positions is effected by a shift mechanism 19 which is coupled with the door 20 of the oven chamber and operated thereby so as to place the support in the upper position when the door is closed and to place it in the lower position when the door is opened. Thus, when the door is open, the rack 10, without encountering any obstruction, can be rolled into and pulled out of the oven chamber 12, and upon the closing of the door the rack is automatically lifted from the floor of the oven chamber so that it can then rotate in the oven chamber without sliding or rolling on the floor. Suitably, the driving motor is connected with a door-operated switch such that it is deenergized with the support oriented in a predetermined direction when the door is opened and energized upon completed closing of the door.

The shift mechanism 19 broadly comprises a collar 21 which surrounds, and is rotatable independently of, the shaft 17. The upper end of the collar supports the shaft and the associated parts, i.e., mainly the support member 14 and the rack 10, and the lower end is supported by a stationary axial or edgewise cam 22 surrounding the shaft. When the collar 21 is rotated, it is moved upwards or downwards in accordance with the shape of the cam 22 and the shaft 17 and, accordingly, the support 14 is moved with it.

The shaft 17 is supported by the upper end of the collar 21 through a pulley 23, by means of which the shaft is driven from the motor 18, and an intermediate thrust bearing 24. The collar, in turn, is supported by the cam 22 on the top wall 25 of the oven through rollers 26 mounted on opposite sides of the collar and having horizontal axes.

As shown in FIG. 2, the collar has a radial arm 27 connected with the door 20 of the oven chamber through a linkage 28. When the door 20 is closed, the rollers 26 of the collar 21 rest on two diametrically opposed, elevated segments of the cam 22 as shown in FIG. 1 and the shaft 17 and the support 14 are then kept in the upper position. When the door is swung to fully open position about its vertical hinge axis as shown in dash-dot lines in FIG. 2, the arm 27 and the collar are turned counter-clockwise approximately 90° so that the rollers 26 of the collar 21 slide down to two low-level cam segments. Under the influence of gravity, the shaft 17 and the support member then slide down to the lower position.

Figure 3:
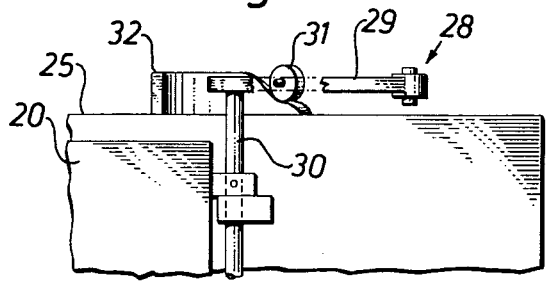
FIG. 3 is a fractional view on line III—III of FIG. 2.

As shown in FIGS. 2 and 3, the linkage 28 comprises a lever 29 which is rigidly joined with the door 20, in that it is nonrotatably and axially immovably secured to a vertical shaft 30, which is nonrotatably and axially immovably secured to the door and defines the hinge axis of the door. This lever 29 has a cam follower roller 31 constantly resting on a vertical or edgewise cam 32 on the top wall 25 of the oven. As shown in FIG. 2, the cam 32 is curved about the shaft 30. Upon swinging of the door 20 to open position, the cam follower roller 31 will roll up the cam 32 and thereby lift the lever 29, and hence the door 20, by a small amount, e.g. 15 to 20 mm. Since at the same time the rack 10 is lowered, the lifting is assisted by the weight of the rack and hence requires no appreciable extra physical effort.

The shape of the cam 32 may vary and is chosen according to the circumstances of each particular case, primarily the shape of the cam 22, but preferably it has a shape such that the major portion of the lifting stroke of the door is traversed in the initial phase of the opening movement. Because of the rapid lifting of the door 20 in the initial phase, there is little danger of the lower edge of the door scraping against the floor.

As the door 20 is closed, it returns to its lower position under the influence of gravity while simultaneously assisting the lifting of the rack 10. Since the major portion of the lowering stroke of the door is traversed in the final phase of the closing movement, it is easy to provide for an efficient sealing of the oven chamber at the lower edge of the door.

The construction of the support 14 illustrated in the drawings and described in more detail hereinafter ensures a proper alignment of the rack 10 with the shaft 17 as well as a firm holding of the rack by the support without interfering with the pushing in or pulling out of the rack.

Figure 4:
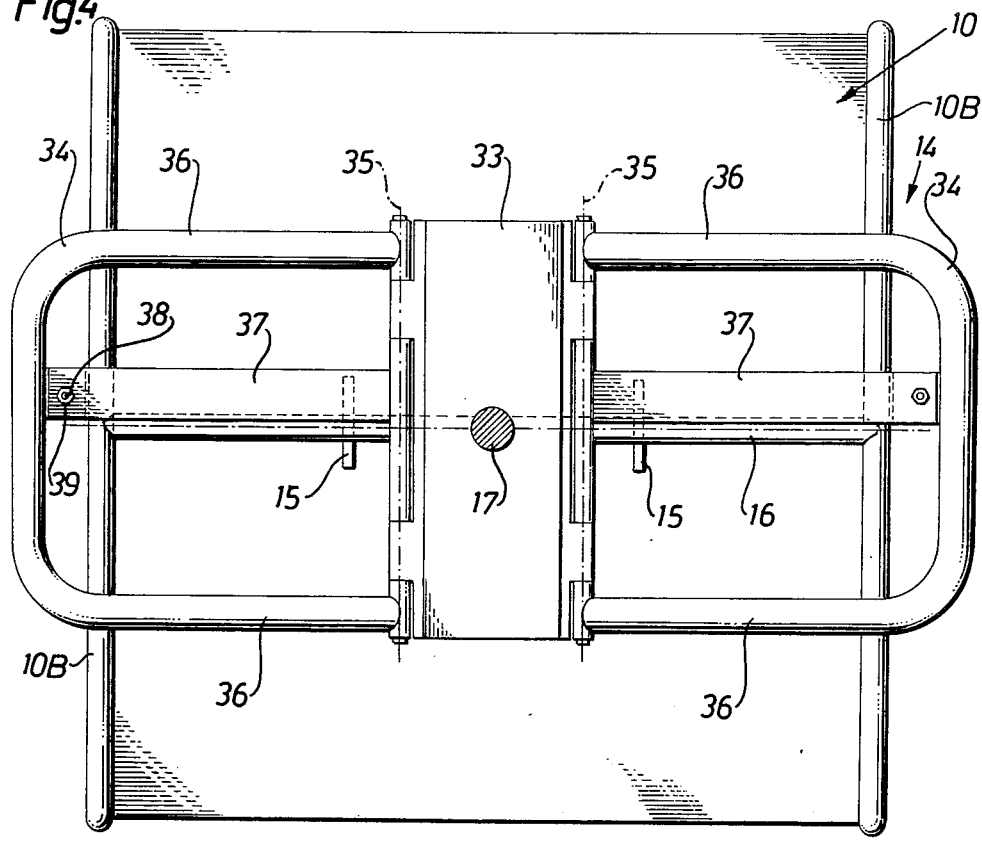
FIG. 4 is an enlarged plan view of the rack support and the rack as seen from line IV—IV of FIG. 1.

As best shown in FIGS. 1 and 4, the support 14 includes a rectangular central portion 33 rigidly secured to the shaft 17, and two tubular U-shaped parts 34 pivoted to respective ones of the longer sides of the central portion. Thus, the tubular U-shaped parts can swing about parallel, horizontal axes 35 extending between the free ends of the limbs 36; the downward swinging movement is limited by abutments (not shown).

Between and parallel to the two limbs 36 of each U-shaped part 34 a bar 37 is disposed which is swingable about the axis 35 relative to the U-shaped part and provided with an adjusting screw 38 with a lock nut 39. By means of the adjusting screw and the lock nut, the position of the bar relative to the U-shaped part may be adjusted and fixed for a purpose which will become apparent as the description proceeds. To the underside of each bar 37 is secured one of the afore-mentioned hooks 15, which are adapted to engage beneath the central horizontal tube 16 at the top of the rack 10. The two hooks 15 are directed in the same direction and located such that the axis of the tube 16 extends along or in a plane containing the vertical axis of the shaft 17 when the tube is resting in the hooks, see FIG. 4.

Figure 5:
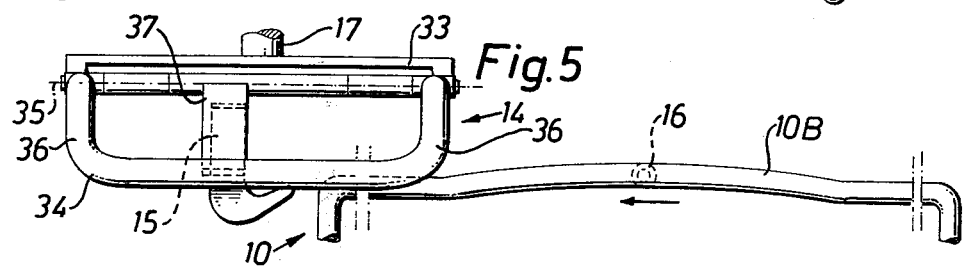
FIGS. 5 and 6 are elevations showing the rack support and the rack in two different relative positions, FIG. 5 showing the relative position in the initial phase of the rolling in of the rack and FIG. 6 showing the relative position when the rolling in of the rack is completed.
Figure 6:
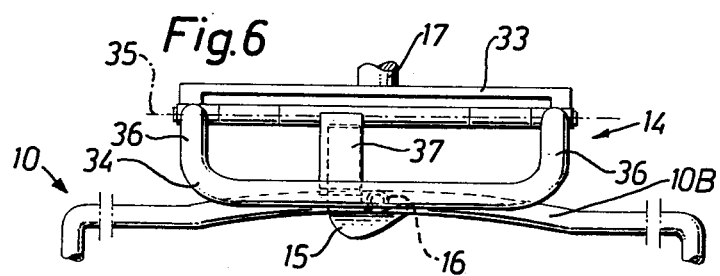

FIGS. 5 and 6 illustrate the coupling together of the rack 10 and the support 14. As the rack 10 is rolled into the oven chamber, the arched upper bars 10B of the rack 10 engage the underside of the limbs 36 situated closest to the door of the oven chamber. By camming action between the upper bars 10B and these limbs 36, the U-shaped parts 34 are swung upwardly, and when the horizontal tube 16 of the rack reaches the hooks 15, the tips of the hooks are level with or slightly lower than the underside of the tube; this is provided for by adjustment of the bars 37 by means of the adjusting screws 38. Thus, the tube, without encountering any obstruction, can enter into the throats of the hooks until it engages the stems of the hooks (FIG. 6). When the support 14 is then shifted to the upper position, the hooks lift the rack 10 by the tube 16, and the outer portions of the limbs 36 press against the upper bars 10B by the action of the weight of the rack. Accordingly, the coupling of the rack to the support is very firm, and relative movements of the support and the rack during the rotation are eliminated.

We claim:
1. Chamber oven for food products, comprising an oven chamber having a door which is swingable about a vertical axis; a movable, e.g. rotatable, support provided at the top of the oven chamber and coupled with a drive, which support is adapted to be releasably coupled with a rack which is horizontally movable into and out of the oven chamber, the support member also being shiftable between a lower position for the coupling together of the rack and the support with the rack resting directly on the floor of the oven chamber, and an upper position in which the rack is freely suspended from the support; and a shifting mechanism connected between the support member and the door and adapted upon swinging of the door to closed position to place the support member in the upper position and upon swinging of the door to open position to place the support member in the lower position, characterized in that the shifting mechanism includes a device for lifting the door of the oven chamber to an upper position under the action of the weight of the rack upon the shifting of the support member to the lower position and for lowering the door to a lower position against the action of the weight of the rack upon the shifting of the support member to the upper position.

2. Oven according to claim 1, characterized in that the support includes two wings which are swingable about a horizontal axis, each wing being adapted to engage the top of the rack at locations remote from each other in the direction of the horizontal axis and from that axis and provided with a hook which is disposed between these locations and the horizontal axis and adapted to engage beneath a central suspension member at the top of the rack, the throats of the two hooks being situated in or adjacent a central vertical plane through the support.

* * * * *